(12) United States Patent
Walker (10) Patent No.: US 7,129,753 B2
(45) Date of Patent: Oct. 31, 2006

(54) CHIP TO CHIP INTERFACE

(75) Inventor: Robert Walker, Raleigh, NC (US)

(73) Assignee: Infineon Technologies AG, Munich (DE)

( * ) Notice: Subject to any disclaimer, the term of this patent is extended or adjusted under 35 U.S.C. 154(b) by 187 days.

(21) Appl. No.: 10/854,463

(22) Filed: May 26, 2004

(65) Prior Publication Data

US 2005/0265062 A1    Dec. 1, 2005

(51) Int. Cl.
*H03K 19/0175* (2006.01)
(52) U.S. Cl. .............................. 326/86; 326/38; 326/93; 365/63
(58) Field of Classification Search .................. 326/21, 326/83, 86, 90; 327/108–112
See application file for complete search history.

(56) References Cited

U.S. PATENT DOCUMENTS

| | | | |
|---|---|---|---|
| 5,355,391 A | | 10/1994 | Horowitz et al. |
| 6,031,396 A | * | 2/2000 | Hoshen et al. ................. 326/93 |
| 6,151,648 A | | 11/2000 | Haq |
| 6,160,423 A | | 12/2000 | Haq |
| 6,255,859 B1 | | 7/2001 | Haq |
| 6,327,205 B1 | | 12/2001 | Haq |
| 6,430,606 B1 | | 8/2002 | Haq |
| 6,472,904 B1 | * | 10/2002 | Andrews et al. ............... 326/38 |
| 6,513,080 B1 | | 1/2003 | Haq |

* cited by examiner

*Primary Examiner*—Vibol Tan
(74) *Attorney, Agent, or Firm*—Dicke, Billig & Czaja, PLLC (57) ABSTRACT

A chip to chip interface comprising a signal line configured to receive a first signal and a receiver. The receiver is configured to provide a first output signal that corresponds to a first bit in response to a clock signal, wherein the receiver is configured to toggle the first bit based on the first output signal and in response to the first signal.

37 Claims, 7 Drawing Sheets

CHIP TO CHIP INTERFACE

BACKGROUND

The need for high speed input/output (I/O) continues to increase as clock speeds increase. I/O transfers between chips on printed circuit boards (PCBs) are becoming increasingly fast. As clock speeds increase, high speed I/O becomes more difficult to realize due to shrinking bit times and set up and hold times not scaling well.

Typical I/O employs at least two lines to transfer data from one chip to another. One line is for the data signal and the other line is for a data strobe or data clock signal. The data signal and the data strobe or data clock signal are transmitted simultaneously from one chip to another via the two lines. At the receiving chip, the data strobe or data clock signal is used to latch in the data bits from the data signal. Skew between the data signal and the data strobe or data clock signal increases the difficulty of transmitting data at high speeds. Skew and other factors across the I/O can dramatically reduce the valid data eye to 50% or less of the data bit time. To reduce skew problems, the data line and the data strobe or data clock line may be precisely routed. Also, in some designs, more data clock or data strobe lines may be added as the data bus gets wider.

I/O can also suffer from a lone pulse problem. A lone pulse problem occurs when there are a series of logic low data bits or a series of logic high data bits and at one point in the series a single bit having the opposite logic level is transmitted. When this occurs, the opposite logic level data bit can be missed as the logic level of the data line may have been pulled too high or too low by the preceding multiple logic high bits or multiple logic low bits. A single bit of the opposite logic level may not overcome the threshold logic level required to characterize the bit.

In a typical data bus, data is transferred continuously requiring constant power to drive both the data signal and the data clock or data strobe signal. Adjacent data bits in the data bus may be switching in different directions during a half cycle of the data clock, which causes crosstalk issues and simultaneous switching issues. Also, I/O can suffer from inflections or slope reversals in the data signal and the data strobe or data clock signal. Inflections or slope reversals can lead to false readings of the data bits from the data signal. These problems become more common and troublesome as I/O speeds increase.

SUMMARY

One aspect of the invention provides a chip to chip interface. The chip to chip interface comprises a signal line configured to receive a first signal and a receiver. The receiver is configured to provide a first output signal that corresponds to a first bit in response to a clock signal, wherein the receiver is configured to toggle the first bit based on the first output signal and in response to the first signal.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION

Figure 1:
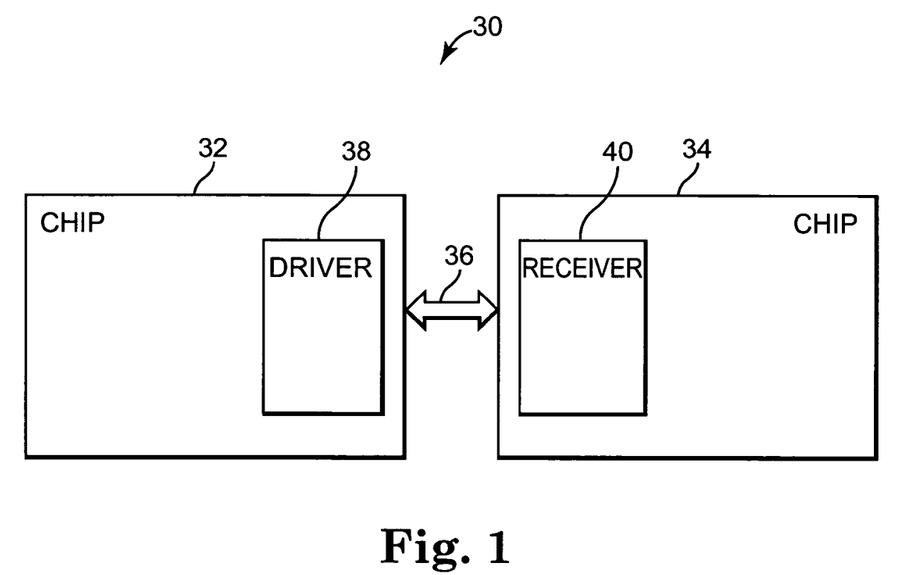
FIG. 1 is a block diagram illustrating one embodiment of a chip to chip interface.

FIG. 1 is a block diagram illustrating one embodiment of a chip to chip interface 30. Chip to chip interface 30 includes chip 32 and chip 34. Chip 32 is electrically coupled to chip 34 via communication link 36. Chip 32 includes driver 38 and chip 34 includes receiver 40. In one embodiment, chip 32 is a memory controller and chip 34 is a memory, such as a double data rate synchronous dynamic random access memory (DDR SDRAM). In other embodiments, chip 32 and chip 34 can be any two suitable chips that transmit signals between each other.

Driver 38 transmits signals to receiver 40 via communication link 36. In one embodiment, driver 38 receives a double data rate (DDR) data signal to transmit to receiver 40. The DDR data signal includes positive edge data aligned with positive edges of a clock signal and negative edge data aligned with negative edges of the clock signal. The positive edge data is referred to as even data and the negative edge data is referred to as odd data.

Communication link 36 includes one or more individual signal lines. Driver 38 transmits signals to receiver 40 via communication link 36 by providing a first signal in response to a change in positive edge data and providing a second signal in response to a change in negative edge data.

The first signal supplied in response to a change in positive edge data is received by receiver 40 and a first bit in receiver 40 toggles in response to the first signal. The first bit is stored in a first memory element and provided as a first output signal in response to a clock signal. The second signal supplied in response to a change in negative edge data is received by receiver 40 and a second bit in receiver 40 toggles in response to the second signal. The second bit is stored in a second memory element and provided as a second output signal in response to a clock signal. The first output signal represents the positive edge data from the DDR data signal in driver 38 and the second output signal represents the negative edge data from the DDR data signal in driver 38. The DDR data signal is not transmitted over communication link 36. Rather, communication link 36 is used to toggle a first bit and a second bit in receiver 40 in response to a change in the positive edge or negative edge data in the DDR data signal in driver 38.

In one embodiment, the clock signal is a 1 GHz clock signal and the DDR data signal is a 2 GHz DDR data signal. In another embodiment, the clock signal is a 1.6 GHz clock signal and the DDR data signal is a 3.2 GHz DDR data signal.

Figure 2:
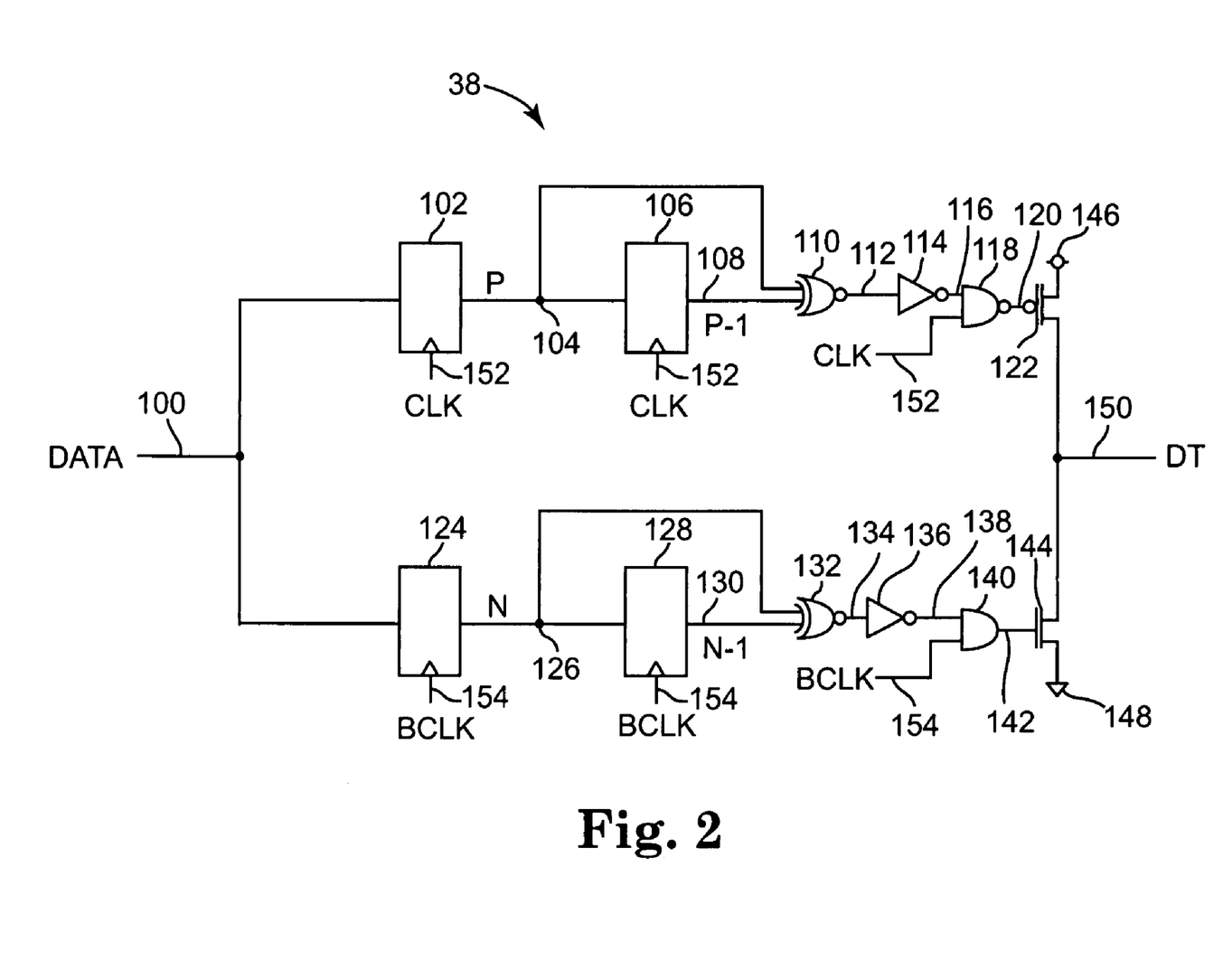
FIG. 2 is a diagram illustrating one embodiment of a driver for the chip to chip interface.

FIG. 2 is a diagram illustrating one embodiment of driver 38. Driver 38 includes flip-flop 102, flip-flop 106, XNOR gate 110, inverter 114, NAND gate 118, and transistor 122. Driver 38 also includes flip-flop 124, flip-flop 128, XNOR gate 132, inverter 136, AND gate 140, and transistor 144. In one embodiment, transistor 122 is a p-channel metal oxide semiconductor (PMOS) field effect transistor (FET) and transistor 144 is an n-channel metal oxide semiconductor (NMOS) FET. In one embodiment, flip-flops 102, 106, 124, and 128 are positive edge triggered D-type flip-flops or other suitable latches.

Input DATA signal path 100 is electrically coupled to the data input of flip-flop 102 and the data input of flip-flop 124. The clock (CLK) signal path 152 is electrically coupled to the clock input of flip-flop 102. The output of flip-flop 102 is electrically coupled to the data input of flip-flop 106 and a first input of XNOR gate 110 via positive edge data (P) signal path 104. The CLK signal path 152 is electrically coupled to the clock input of flip-flop 106. The output of flip-flop 106 is electrically coupled to a second input of XNOR gate 110 via previous positive edge data (P−1) signal path 108. The output of XNOR gate 110 is electrically coupled to the input of inverter 114 via signal path 112. The output of inverter 114 is electrically coupled to a first input of NAND gate 118 via signal path 116. A second input of NAND gate 118 is electrically coupled to the CLK signal path 152. The output of NAND gate 118 is electrically coupled to the gate of transistor 122 via signal path 120. One side of the drain-source path of transistor 122 is electrically coupled to supply voltage 146 and the other side of the drain-source path of transistor 122 is electrically coupled to the data transmitted (DT) signal path 150.

The clock input of flip-flop 124 is electrically coupled to the inverted CLK (BCLK) signal path 154. The output of flip-flop 124 is electrically coupled to the data input of flip-flop 128 and a first input of XNOR gate 132 via negative edge data (N) signal path 126. The BCLK signal path 154 is electrically coupled to the clock input of flip-flop 128. The output of flip-flop 128 is electrically coupled to a second input of XNOR gate 132 via previous negative edge data (N−1) signal path 130. The output of XNOR gate 132 is electrically coupled to the input of inverter 136 via signal path 134. The output of inverter 136 is electrically coupled to a first input of AND gate 140 via signal path 138. A second input of AND gate 140 is electrically coupled to the BCLK signal path 154. The output of AND gate 140 is electrically coupled to the gate of transistor 144 via signal path 142. One side of the drain-source path of transistor 144 is electrically coupled to DT signal path 150 and the other side of the drain-source path of transistor 144 is electrically coupled to reference voltage 148. In one embodiment, reference voltage 148 is ground.

The input DATA signal on data path 100 is a DDR data stream. Flip-flops 102 and 124 divide the double data rate data stream into positive edge data and negative edge data. On each rising edge of the CLK signal, flip-flop 102 latches the positive edge data bit of the input DATA signal. The P signal output of flip-flop 102 indicates the current positive edge data bit. On each positive edge of the BCLK signal, flip-flop 124 latches the negative edge data bit of the input DATA signal. The N signal output of flip-flop 124 indicates the current negative edge data bit.

Flip-flop 106 latches the P signal output from flip-flop 102 on each rising edge of the CLK signal. The output P−1 signal of flip-flop 106 indicates the previous positive edge data bit. The XNOR gate 110 exclusively nors the P and P−1 signals. The output of XNOR gate 110 is a logic low if one of P and P−1 is logic high and the other of P and P−1 is logic low. The output of XNOR gate 110 is logic high if P and P−1 are both logic high or both logic low. The output from the XNOR gate 110 is inverted through inverter 114. The output from inverter 114 is input to NAND gate 118 along with the CLK signal. If the output of NAND gate 118 is logic low, transistor 122 turns on and the supply voltage 146 pulls the DT signal to a logic high. If the output of NAND gate 118 is logic high, transistor 122 turns off and the drain-source path of transistor 122 becomes high impedance. Each change in the positive edge data from a logic low to a logic high or from a logic high to a logic low results in transistor 122 turning on and driving the DT signal on path 150 to a logic high.

Flip-flop 128 latches the N signal output from flip-flop 124 on each rising edge of the BCLK signal. The output N−1 signal of flip-flop 128 indicates the previous negative edge data bit. The XNOR gate 132 exclusively nors the N and N−1 signals. The output of XNOR gate 132 is a logic low if one of N and N−1 is logic high and the other of N and N−1 is logic low. The output of XNOR gate 132 is logic high if N and N−1 are both logic high or both logic low. The output from XNOR gate 132 is inverted through inverter 136. The output from inverter 136 is input to AND gate 140 along with the BCLK signal. If the output of AND gate 140 is logic high, transistor 144 turns on and the reference voltage 148 pulls the DT signal to a logic low. If the output of AND gate 140 is logic low, transistor 144 turns off and the drain-source path of transistor 144 becomes high impedance. Each change in the negative edge data from a logic low to a logic high or from a logic high to a logic low results in transistor 144 turning on and driving the DT signal on path 150 to a logic low.

In operation, if the P and P−1 signals are both logic high or both logic low, the output of inverter 114 is at a logic low and the output of NAND gate 118 provides a logic high to the gate of transistor 122. Transistor 122 is turned off (non-conducting) and the drain-source path of transistor 122 is high impedance. If the P and P−1 signals are at opposite logic levels, the output of inverter 144 is logic high and the output of NAND gate 118 provides a logic low if the CLK signal is also at a logic high. The logic low provided to the gate of transistor 122 pulls the DT signal to a logic high for a half cycle of the CLK signal while the CLK signal is logic high. For positive edge bit stream data, a logic high pulse is generated each time a positive edge bit changes from a zero to a one or from a one to a zero.

If the N and N−1 signals are both logic high or both logic low, the output of inverter 136 is at a logic low and the output of NAND gate 140 provides a logic low to the gate of transistor 144. Transistor 144 is turned off and the drain-source path of transistor 144 is high impedance. If the N and N−1 signals are at opposite logic levels, the output of inverter 136 is at a logic high. The output of NAND gate 140 provides a logic high if the BCLK signal is also at a logic high. The logic high provided to the gate of transistor 144 pulls the DT signal to a logic low for a half cycle of the BCLK signal while the BCLK signal is logic high. For negative edge bit stream data, a logic low pulse is generated each time a negative edge bit changes from a zero to a one or from a one to a zero. If neither a logic high pulse nor a logic low pulse is generated, the DT signal remains at the termination voltage of signal path 150.

Figure 3:
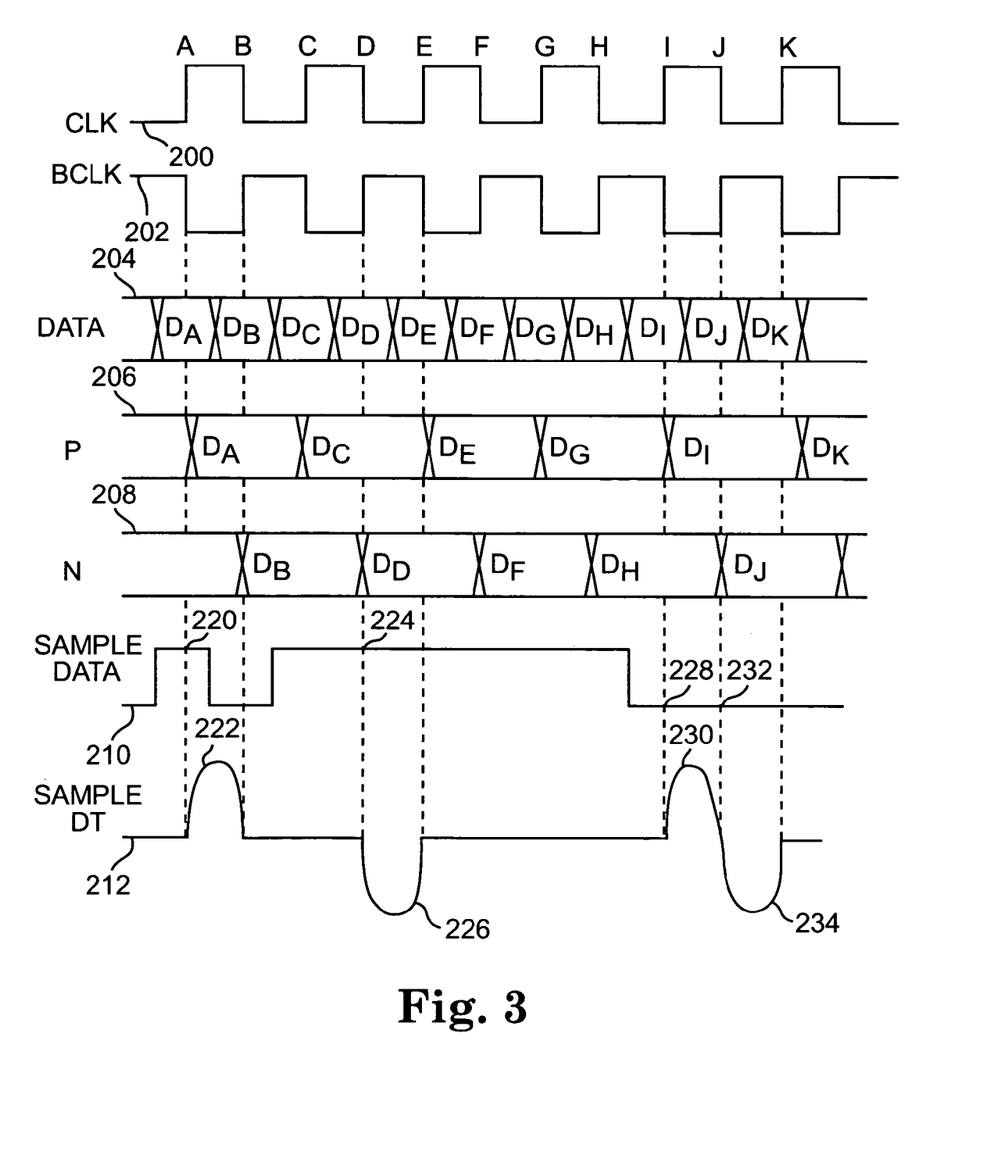
FIG. 3 is a timing diagram illustrating the timing of signals for the driver for the chip to chip interface.

FIG. 3 is a timing diagram illustrating the timing of signals in driver 38. The timing diagram includes CLK signal 200 on signal path 152, BCLK signal 202 on signal path 154, DATA signal 204 on signal path 100, P signal 206 on signal path 104, N signal 208 on signal path 126, a sample data signal 210 for input on signal path 100, and a sample data transmitted (DT) signal 212 on signal path 150.

The CLK signal 200 includes clock edges A–K. Rising or positive edges of the CLK signal 200 are indicated at A, C, E, G, I, and K. Falling or negative edges of the CLK signal 200 are indicated at B, D, F, H, and J. The BCLK signal 202 is the inverse of CLK signal 200. The DATA signal 204 is a double data rate data stream. Double data rate data signal 204 is divided into positive bit stream data and negative bit stream data. The positive bit stream data is defined as the data that is latched in at the positive edges of CLK signal 200 and includes $D_A$, $D_C$, $D_E$, $D_G$, $D_I$, and $D_K$. The negative bit stream data is defined as the data that is latched in at the negative edges of CLK signal 200 and includes $D_B$, $D_D$, $D_F$, $D_H$, and $D_J$.

Flip-flop 102 latches in the positive bit stream data on each positive edge of CLK signal 200. The output of flip-flop 102, indicated at P signal 206, includes $D_A$, $D_C$, $D_E$, $D_G$, $D_I$, and $D_K$. Flip-flop 124 latches in the negative bit stream data on each positive edge of BCLK signal 202. The output of flip-flop 124, indicated at N signal 208, includes $D_B$, $D_D$, $D_F$, $D_H$, and $D_J$.

Each change in the positive bit stream data, P signal 206, from a logic low to a logic high or from a logic high to a logic low, pulls the output DT signal to a logic high though transistor 122 and supply voltage 146. Each change in the negative bit stream data, N signal 208, from a logic low to a logic high or from a logic high to a logic low, pulls the output DT signal to a logic low through transistor 144 and reference voltage 148. For each change in the positive bit stream data, the output DT signal is pulled to a logic high to supply a logic high pulse for a half cycle of CLK signal 200. For each change in the negative bit stream data, the output DT signal is pulled to a logic low to supply a logic low pulse for a half cycle of BCLK signal 202.

Sample data signal 210 illustrates an example of a DDR data signal on path 100. Sample data signal 210 includes $D_A$=logic high, $D_B$=logic low, $D_C$–$D_H$=logic high, and $D_I$–$D_K$=logic low. As sample data signal 210 is input on signal path 100 into driver 38, sample DT signal 212 is output from driver 38 on signal path 150.

To begin, flip-flops 102, 106, 124, and 128 are reset to output logic lows. At CLK signal edge A, a logic high $D_A$ of sample data 210 is latched into flip-flip 102 at 220. This pulls sample DT signal 212 to a logic high at 222 for a half cycle of CLK signal 200 between CLK signal edges A and B. At CLK signal edge B, a logic low $D_B$ is supplied and there is no change in the negative bit stream data, such that sample DT signal 212 remains at the termination voltage of signal path 150. At positive CLK signal edges C, E, and G, a logic high is supplied and there is no change in the positive bit stream data and no logic high pulses are generated in DT signal 212.

At negative CLK signal edge D, the negative bit stream data changes from a logic low to a logic high. Logic high $D_D$ of sample data signal 210 is latched into flip-flop 124 at 224. This pulls sample DT signal 212 to a logic low at 226 for a half cycle of BCLK signal 202 between CLK signal edges D and E. At negative CLK signal edges F and H, a logic high is supplied and there is no change in the negative bit stream data and no logic low pulses are generated in DT signal 212.

At CLK signal edge I, the positive bit stream data changes from a logic high to a logic low. Logic low $D_I$ of sample data signal 210 is latched into flip-flop 102 at 228. This pulls sample DT signal 212 to a logic high at 230 for a half cycle of CLK signal 200 between CLK signal edges I and K. At CLK signal edge J, the negative bit stream data changes from a logic high to a logic low. Logic low $D_J$ is latched into flip-flop 124 at 232, which pulls sample DT signal 212 to a logic low at 234 for a half cycle of BCLK signal 202 between CLK signal edges J and K.

Figure 4:
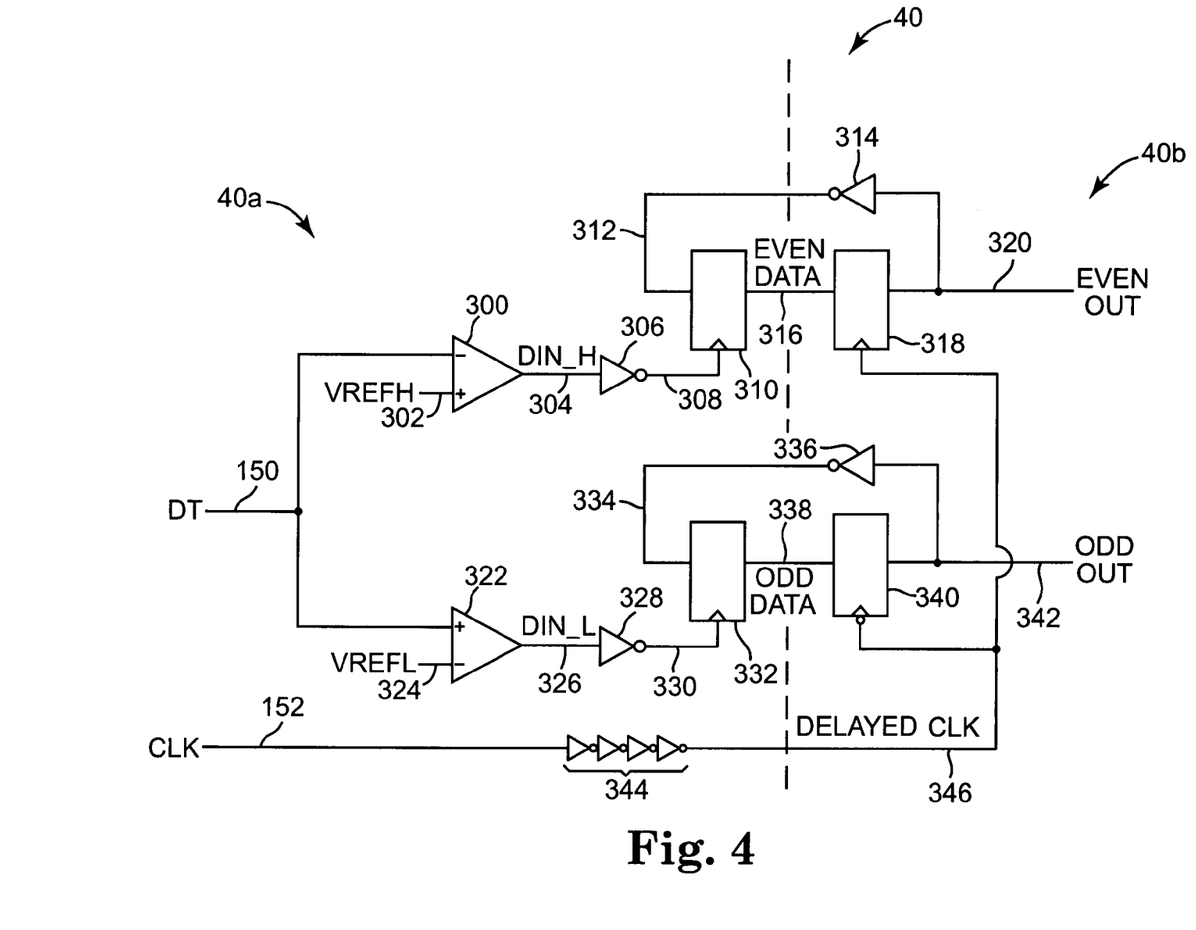
FIG. 4 is a diagram illustrating one embodiment of a receiver for the chip to chip interface.

FIG. 4 is a diagram illustrating one embodiment of receiver 40. Receiver 40 includes a first stage, indicated at 40a, and a second stage, indicated at 40b. The first stage 40a includes operational amplifier (op amp) 300, op amp 322, inverter 306, inverter 328, flip-flop 310, flip-flop 332 and delay chain 344. In one embodiment, delay chain 344 is a series of four inverters. The second stage 40b includes inverter 314, inverter 336, flip-flop 318 and flip-flop 340. In one embodiment, flip-flops 310, 318, and 332 are positive edge triggered D-type flip-flops or other suitable latches and flip-flop 340 is a negative edge triggered D-type flip-flop or other suitable latch.

DT signal path 150 is electrically coupled to the negative input of op amp 300 and the positive input of op amp 322. VREFH signal path 302 is electrically coupled to the positive input of op amp 300. The output of op amp 300 is electrically coupled to the input of inverter 306 via data in high (DIN_H) signal path 304. The output of inverter 306 is electrically coupled to the clock input of flip-flop 310 via signal path 308. The output of flip-flop 310 is electrically coupled to the data input of flip-flop 318 via EVEN DATA signal path 316. The output of flip-flop 318 is electrically coupled to the input of inverter 314 via EVEN OUT signal path 320. The output of inverter 314 is electrically coupled to the data input of flip-flop 310 via signal path 312. The clock input of flip-flop 318 is electrically coupled to the output of inverter chain 344 via DELAYED CLK signal path 346 and the CLK signal path 152 is electrically coupled to the input of inverter chain 344.

The VREFL signal path 324 is electrically coupled to the negative input of op amp 322. The output of op amp 322 is electrically coupled to the input of inverter 328 via data in low (DIN_L) signal path 326. The output of inverter 328 is electrically coupled to the clock input of flip-flop 332 via signal path 330. The output of flip-flop 332 is electrically coupled to the data input of flip-flop 340 via ODD DATA signal path 338. The output of flip-flop 340 is electrically coupled to the input of inverter 336 via ODD OUT signal path 342. The output of inverter 336 is electrically coupled to the data input of flip-flop 332 via signal path 334. The clock input of flip-flop 340 is electrically coupled to the output of inverter delay chain 344 via DELAYED CLK signal path 346.

Op amp 300 operates as a comparator and receives the DT and VREFH signals as inputs. In one embodiment, VREFH is a constant voltage signal greater than the termination voltage of path 150 and less than the supply voltage 146.

If the voltage of the DT signal transitions from a voltage less than the voltage of the VREFH signal to a voltage greater than the voltage of the VREFH signal, the output DIN_H signal transitions from a logic high to a logic low. The DIN_H signal is inverted by inverter 306 to provide a transition from a logic low to a logic high at the output of inverter 306. The logic low to logic high transition at the output of inverter 306 clocks flip-flop 310, which clocks in the output of inverter 314. Flip-flop 310 provides the bit wide EVEN DATA signal at the output of flip-flop 310 to the data input of flip-flop 318. After the logic low to logic high transition at the output of inverter 306, the EVEN DATA signal is at the same logic level as the output of inverter 314.

If the voltage of the DT signal remains less than the voltage of the VREFH signal, the output DIN_H signal remains at a logic high. The logic high DIN_H signal is inverted to a logic low by inverter 306. The logic low output of inverter 306 does not clock flip-flop 310 and the output of inverter 314 is not clocked into flip-flop 310. The EVEN DATA signal at the output of flip-flop 310 remains unchanged.

The EVEN DATA signal is clocked into flip-flop 318 at the rising edge of the DELAYED CLK signal to make the logic level of the EVEN OUT signal the same as the logic level of the EVEN DATA signal. Flip-flop 318 provides the EVEN OUT signal on path 320 to inverter 314 and as an output signal to other circuits in chip 34. Inverter 314 inverts the EVEN OUT signal and provides the inverted EVEN OUT signal to the data input of flip-flop 310. The inverted EVEN OUT signal and the EVEN DATA signal are at opposite logic levels.

If the voltage of the DT signal transitions from a voltage less than the voltage of the VREFH signal to a voltage greater than the voltage of the VREFH signal, a logic low to logic high transition at the output of inverter 306 toggles the output of flip-flop 310 to make the logic level of the EVEN DATA signal the same as the logic level of the inverted EVEN OUT signal. The flip-flop 310 toggles once with the EVEN OUT signal at one logic level. Multiple transitions of the DT signal voltage past the VREFH signal voltage, such as those transitions caused by crosstalk, inflections or slope reversals, do not toggle the output of flip-flop 310 multiple times.

A subsequent rising edge of the DELAYED CLK signal clocks the EVEN DATA signal into flip-flop 318 to make the logic level of the EVEN OUT signal the same as the logic level of the EVEN DATA signal. The flip-flop 318 toggles once with the EVEN DATA signal at one logic level. Multiple rising edges of the DELAYED CLK signal, such as those caused by crosstalk, inflections or slope reversals, do not toggle the output of flip-flop 318 multiple times.

Op amp 322 operates as a comparator and receives the DT and VREFL signals as inputs. In one embodiment, VREFL is a constant voltage signal less than the termination voltage of path 150 and greater than the reference voltage 148.

If the voltage of the DT signal transitions from a voltage greater than the voltage of the VREFL signal to a voltage less than the voltage of the VREFL signal, the output DIN_L signal transitions from a logic high to a logic low. The DIN_L signal is inverted by inverter 328 to provide a transition from a logic low to a logic high at the output of inverter 328. The transition from a logic low to a logic high at the output of inverter 328 clocks flip-flop 332, which clocks in the output of inverter 336. Flip-flop 332 provides the bit wide ODD DATA signal at the output of flip-flop 332 to the data input of flip-flop 340. The ODD DATA signal is at the same logic level as the output of inverter 336.

If the voltage of the DT signal remains greater than the voltage of the VREFL signal, the output DIN_L signal remains at a logic high. The logic high DIN_L signal is inverted to a logic low by inverter 328. The logic low output of inverter 328 does not clock flip-flop 332 and the output of inverter 336 is not clocked into flip-flop 332. The ODD DATA signal at the output of flip-flop 310 remains unchanged.

The ODD DATA signal is latched into flip-flop 340 at the falling edge of the DELAYED CLK signal to make the logic level of the ODD OUT signal the same as the logic level of the ODD DATA signal. Flip-flop 340 provides the ODD OUT data signal on path 342 to inverter 336 and as an output signal to other circuits in chip 34. Inverter 336 inverts the ODD OUT signal and provides the inverted ODD OUT signal to the data input of flip-flop 332. The inverted ODD OUT signal and the ODD DATA signal are at opposite logic levels.

If the voltage of the DT signal transitions from a voltage greater than the voltage of the VREFL signal to a voltage less than the voltage of the VREFL signal, a logic low to logic high transition at the output of inverter 328 toggles the output of flip-flop 332 to make the logic level of the ODD DATA signal the same as the logic level of the inverted ODD OUT signal. The flip-flop 332 toggles once with the ODD OUT signal at one logic level. Multiple transitions of the DT signal voltage past the VREFL signal voltage, such as those caused by crosstalk, inflections or slope reversals, do not toggle the output of flip-flop 332 multiple times.

A subsequent falling edge of the DELAYED CLK signal clocks the ODD DATA signal into flip-flop 340 to make the logic level of the ODD OUT signal the same as the logic level of the ODD DATA signal. The flip-flop 340 toggles once with the ODD DATA signal at one logic level. Multiple falling edges of the DELAYED CLK signal, such as those caused by crosstalk, inflections or slope reversals, do not toggle the output of flip-flop 340 multiple times.

Figure 5:
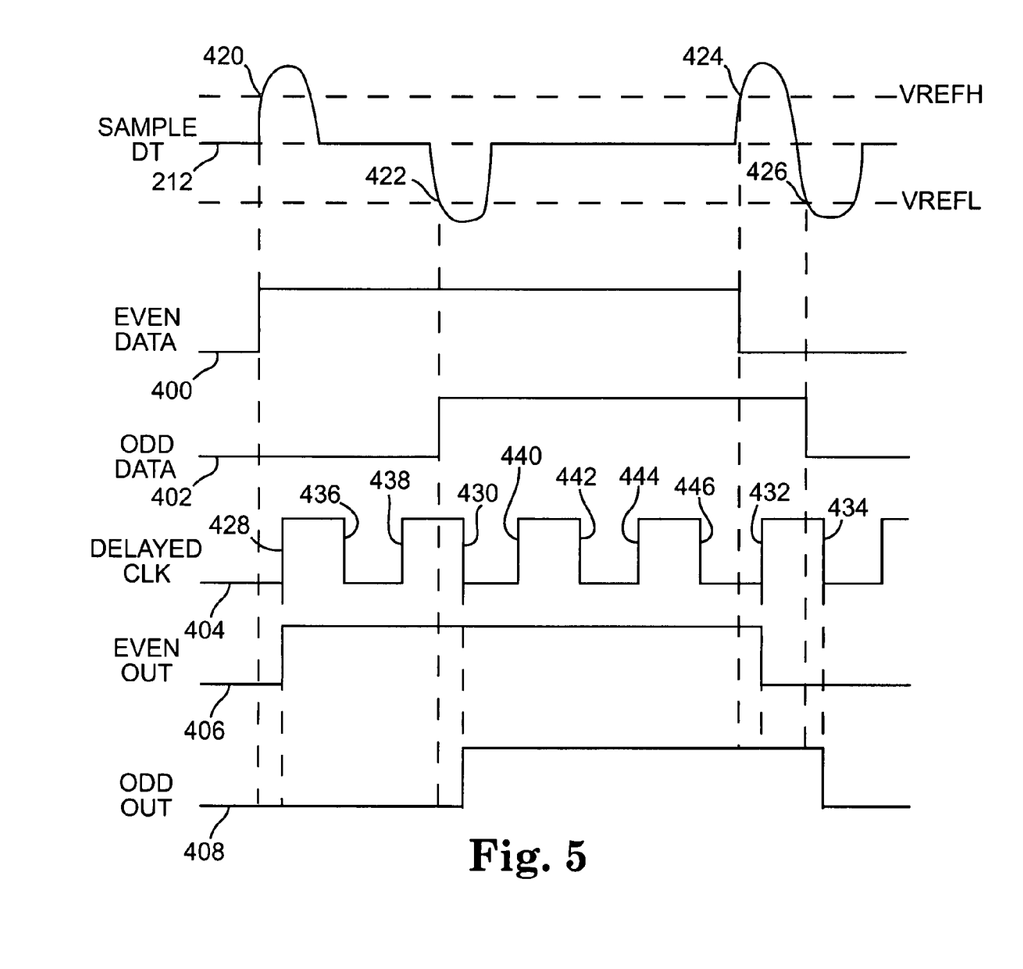
FIG. 5 is a timing diagram illustrating the timing of signals for the receiver of FIG. 4 for the chip to chip interface.

FIG. 5 is a timing diagram illustrating the timing of signals for receiver 40. The timing diagram includes sample DT signal 212 on signal path 150, EVEN DATA signal 400 on signal path 316, ODD DATA signal 402 on signal path 338, DELAYED CLK signal 404 on signal path 346, EVEN OUT signal 406 on signal path 320, and ODD OUT signal 408 on signal path 342.

To begin, flip-flops 310, 318, 332, and 340 are reset to logic low level outputs. The sample DT signal 212 rises above VREFH at 420 to clock flip-flop 310 and toggle the EVEN DATA signal 400 from a logic low to a logic high. The DELAYED CLK signal 404 transitions from a logic low to a logic high at 428 to clock the logic high EVEN DATA signal 400 into flip-flop 318 and change the EVEN OUT signal 406 from a logic low to a logic high.

Next, the falling edge at 436 of DELAYED CLK signal 404 clocks flip-flop 340. With the ODD DATA signal at a logic low, the ODD OUT signal remains at a logic low. The rising edge at 438 of DELAYED CLK signal 404 clocks flip-flop 318 and with the EVEN DATA signal at a logic high, the EVEN OUT signal remains at a logic high.

Next, the sample DT signal 212 falls below VREFL at 422 to clock flip-flop 332 and toggle the ODD DATA signal 402 from a logic low to a logic high. The DELAYED CLK signal 404 transitions from a logic high to a logic low at 430 to clock the logic high ODD DATA signal 402 into flip-flop 340 and change the ODD OUT signal 408 from a logic low to a logic high.

The rising edge at 440 of DELAYED CLK signal 404 clocks flip-flop 318. With the EVEN DATA signal at a logic high, the EVEN OUT signal remains at a logic high. The falling edge at 442 of DELAYED CLK signal 404 clocks flip-flop 340. With the ODD DATA signal at a logic high, the ODD OUT signal remains at a logic high. Next, the rising edge at 444 of DELAYED CLK signal 404 clocks flip-flop 318 and with the EVEN DATA signal at a logic high, the EVEN OUT signal remains at a logic high. The falling edge at 446 of DELAYED CLK signal 404 clocks flip-flop 340 and with the ODD DATA signal at a logic high, the ODD OUT signal remains at a logic high.

Next, the sample DT signal 212 rises above VREFH at 424, indicating a change in the positive bit stream data. The sample DT signal 212 rises at 424 to clock flip-flop 310 and toggle the EVEN DATA signal 400 from a logic high to a logic low. The DELAYED CLK signal 404 transitions from a logic low to a logic high at 432 to clock the logic low EVEN DATA signal 400 into flip-flop 318 and change the EVEN OUT signal 406 from a logic high to a logic low.

Next, the sample DT signal 212 falls below VREFL at 426, indicating a change in the negative bit stream data. The sample DT signal 212 falls at 426 to clock flip-flop 332 and toggle the ODD DATA signal 402 from a logic high to a logic low. The DELAYED CLK signal 404 transitions from a logic high to a logic low at 434 to clock the logic low ODD DATA signal 402 into flip-flop 340 and change the ODD OUT signal 408 from a logic high to a logic low.

The positive edge data stream and negative edge data stream provided to driver 38 are recreated as EVEN OUT signal 406 on path 320 and ODD OUT signal 408 on path 342. The double data rate data is transferred from chip 32 to chip 34 by toggling bits in receiver 40.

Figure 6:
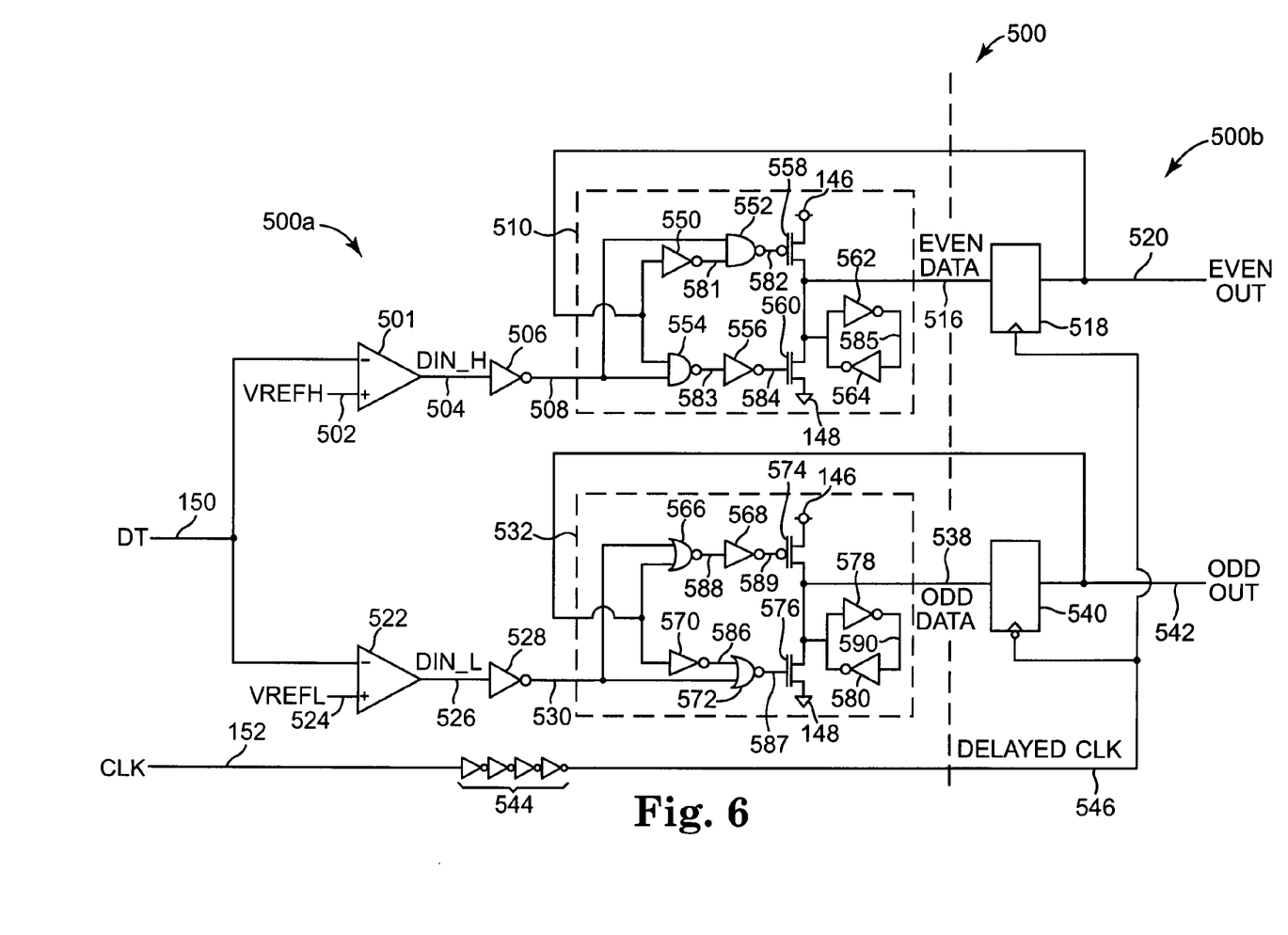
FIG. 6 is a diagram illustrating one embodiment of a receiver for the chip to chip interface.

FIG. 6 is a diagram illustrating one embodiment of a receiver 500 that can be used alongside or in place of receiver 40. Receiver 500 includes a first stage, indicated at 500a, and a second stage, indicated at 500b. The first stage 500a includes op amp 501, op amp 522, inverter 506, inverter 528, input latch 510, input latch 532 and delay chain 544. In one embodiment, delay chain 544 includes a series of four inverters. The second stage 500b includes flip-flop 518 and flip-flop 540. In one embodiment, flip-flop 518 is a positive edge triggered D-type flip-flop or another suitable latch and flip-flop 540 is a negative edge triggered D-type flip-flop or another suitable latch.

Input latch 510 includes inverter 550, NAND gate 552, NAND gate 554, inverter 556, transistor 558, transistor 560, inverter 562 and inverter 564. In one embodiment, transistor 558 is a PMOS FET and transistor 560 is an NMOS FET. Input latch 532 includes NOR gate 566, inverter 568, inverter 570, NOR gate 572, transistor 574, transistor 576, inverter 578 and inverter 580. In one embodiment, transistor 574 is a PMOS FET and transistor 576 is an NMOS FET.

DT signal path 150 is electrically coupled to the negative input of op amp 501 and the negative input of op amp 522. VREFH signal path 502 is electrically coupled to the positive input of op amp 501. The output of op amp 501 is electrically coupled to the input of inverter 506 via DIN_H signal path 504. The output of inverter 506 is electrically coupled to one input of NAND gate 552 and one input of NAND gate 554 via signal path 508. The output of input latch 510 is electrically coupled to the data input of flip-flop 518 via EVEN DATA signal path 516. The output of flip-flop 518 is electrically coupled to the input of inverter 550 and one input of NAND gate 554 via EVEN OUT signal path 520. The clock input of flip-flop 518 is electrically coupled to the output of inverter chain 544 via DELAYED CLK signal path 546 and the CLK signal path 152 is electrically coupled to the input of inverter chain 544.

The VREFL signal path 524 is electrically coupled to the positive input of op amp 522. The output of op amp 522 is electrically coupled to the input of inverter 528 via DIN_L signal path 526. The output of inverter 528 is electrically coupled to one input of NOR gate 566 and one input of NOR gate 572 via signal path 530. The output of input latch 532 is electrically coupled to the data input of flip-flop 540 via ODD DATA signal path 538. The output of flip-flop 540 is electrically coupled to one input of NOR gate 566 and the input of inverter 570 via ODD OUT signal path 542. The clock input of flip-flop 540 is electrically coupled to the output of inverter delay chain 544 via DELAYED CLK signal path 546.

In input latch 510, the output of inverter 550 is electrically coupled to one input of NAND gate 552 via signal path 581 and the output of NAND gate 552 is electrically coupled to the gate of transistor 558 via signal path 582. The output of NAND gate 554 is electrically coupled to the input of inverter 556 via signal path 583 and the output of inverter 556 is electrically coupled to the gate of transistor 560 via signal path 584. One side of the drain-source path of transistor 558 is electrically coupled to supply voltage 146. The other side of the drain-source path of transistor 558 is electrically coupled to one side of the drain-source path of transistor 560 via EVEN DATA signal path 516. The other side of the drain-source path of transistor 560 is electrically coupled to reference voltage 148. The input of inverter 564 is electrically coupled to the output of inverter 562 via signal path 585. The output of inverter 564 is electrically coupled to the input of inverter 562 via EVEN DATA signal path 516. The EVEN DATA signal path 516 provides the output of input latch 510 to the data input of flip-flop 518.

In input latch 532, the output of inverter 570 is electrically coupled to one input of NOR gate 572 via signal path 586 and the output of NOR gate 572 is electrically coupled to the gate of transistor 576 via signal path 587. The output of NOR gate 566 is electrically coupled to the input of inverter 568 via signal path 588 and the output of inverter 568 is electrically coupled to the gate of transistor 574 via signal path 589. One side of the drain-source path of transistor 574 is electrically coupled to supply voltage 146. The other side of the drain-source path of transistor 574 is electrically coupled to one side of the drain-source path of transistor 576 via ODD DATA signal path 538. The other side of the drain-source path of transistor 576 is electrically coupled to reference voltage 148. The input of inverter 580 is electrically coupled to the output of inverter 578 via signal path 590. The output of inverter 580 is electrically coupled to the input of inverter 578 via ODD DATA signal path 538. The ODD DATA signal path 538 provides the output of input latch 532 to the data input of flip-flop 540.

Op amp 501 operates as a comparator and receives the DT and VREFH signals as inputs. In one embodiment, VREFH is a constant voltage signal greater than the termination voltage of path 150 and less than the supply voltage 146.

If the voltage of the DT signal is less than the voltage of the VREFH signal, the output DIN_H signal is at a logic high. The logic high DIN_H signal is inverted to a logic low by inverter 506 and the logic low output of inverter 506 is provided to NAND gates 552 and 554. In response to the logic low input, NAND gate 552 provides a logic high output to transistor 558, which turns off transistor 558. NAND gate 554 provides a logic high to inverter 556 that inverts the logic high to a logic low and provides the logic low to transistor 560, which turns off transistor 560. Inverters 562 and 564 function as a latch to latch in the logic value on EVEN DATA signal path 516. With transistors 558 and 560 turned off, the logic level latched in by inverters 562 and 564 does not change and the EVEN DATA signal at the output of input latch 510 remains unchanged.

If the voltage of the DT signal transitions from a voltage less than the voltage of the VREFH signal to a voltage greater than the voltage of the VREFH signal, the output DIN_H signal transitions from a logic high to a logic low. The DIN_H signal is inverted by inverter 506 and the logic low to logic high transition at the output of inverter 506 is provided to NAND gates 552 and 554. The resulting logic high is provided to one input of NAND gate 552 and one input of NAND gate 554.

The EVEN OUT signal is provided to the other input of NAND gate 554 and to inverter 550. The inverter 550 inverts the EVEN OUT signal and provides the inverted EVEN OUT signal to the other input of NAND gate 552. NAND gate 552 inverts the inverted EVEN OUT signal and provides the logic level of the EVEN OUT signal to transistor 558. NAND gate 554 inverts the EVEN OUT signal and provides the inverted EVEN OUT signal to inverter 556 that inverts the inverted EVEN OUT signal to provide the logic level of the EVEN OUT signal to transistor 560.

If the EVEN OUT signal is at a logic low, transistor 558 turns on and transistor 560 turns off. This charges the EVEN DATA signal path 516 to a logic high. If the EVEN OUT signal is at a logic high, transistor 558 is turned off and transistor 560 is turned on. This discharges the EVEN DATA signal path 516 to a logic low. Input latch 510 provides the bit wide EVEN DATA signal to the data input of flip-flop 518. After the logic low to logic high transition at the output of inverter 506, the EVEN DATA signal is the inverse of the EVEN OUT signal at the output of flip-flop 518.

The EVEN DATA signal is clocked into flip-flop 518 at the rising edge of the DELAYED CLK signal to make the logic level of the EVEN OUT signal the same as the logic level of the EVEN DATA signal. Flip-flop 518 provides the EVEN OUT signal on path 520 to inverter 550, NAND gate 554 and as an output signal to other circuits in chip 34.

If the voltage of the DT signal transitions from a voltage less than the voltage of the VREFH signal to a voltage greater than the voltage of the VREFH signal, a logic low to logic high transition at the output of inverter 506 toggles the output of input latch 510 to make the logic level of the EVEN DATA signal the inverse of the EVEN OUT signal. The input latch 510 toggles once with the EVEN OUT signal at one logic level. Multiple transitions of the DT signal voltage past the VREFH signal voltage, such as those transitions caused by crosstalk, inflections or slope reversals, do not toggle the output of input latch 510 multiple times.

A subsequent rising edge of the DELAYED CLK signal clocks the EVEN DATA signal into flip-flop 518 to make the logic level of the EVEN OUT signal the same as the logic level of the EVEN DATA signal. The flip-flop 518 toggles once with the EVEN DATA signal at one logic level. Multiple rising edges of the DELAYED CLK signal, such as those caused by crosstalk, inflections or slope reversals, do not toggle the output of flip-flop 518 multiple times.

Op amp 522 operates as a comparator and receives the DT and VREFL signals as inputs. In one embodiment, VREFL is a constant voltage signal less than the termination voltage of path 150 and greater than the reference voltage 148.

If the voltage of the DT signal is greater than the voltage of the VREFL signal, the output DIN_L signal is at a logic low. The logic low DIN_L signal is inverted to a logic high by inverter 528 and the logic high output of inverter 528 is provided to NOR gates 566 and 572. In response to the logic high input, NOR gate 572 provides a logic low output to transistor 576, which turns off transistor 576. NOR gate 566 provides a logic low to inverter 568 that inverts the logic low to a logic high and provides the logic high to transistor 575, which turns off transistor 574. Inverters 578 and 580 function as a latch to latch in the logic level on ODD DATA signal path 538. With transistors 574 and 576 turned off, the logic level latched into inverters 578 and 580 does not change and the ODD DATA signal at the output of input latch 532 remains unchanged.

If the voltage of the DT signal transitions from a voltage greater than the voltage of the VREFL signal to a voltage less than the voltage of the VREFL signal, the output DIN_L signal transitions from a logic low to a logic high. The DIN_L signal is inverted by inverter 528 and the logic high to logic low transition at the output of inverter 528 is provided to NOR gates 566 and 572. The resulting logic low is provided to one input of NOR gate 566 and one input of NOR gate 572.

The ODD OUT signal is provided to the other input of NOR gate 566 and to inverter 570. The inverter 570 inverts the ODD OUT signal and provides the inverted ODD OUT signal to the other input of NOR gate 572. NOR gate 572 inverts the inverted ODD OUT signal and provides the logic level of the ODD OUT signal to transistor 576. NOR gate 566 inverts the ODD OUT signal and provides the inverted ODD OUT signal to inverter 568 that inverts the inverted ODD OUT signal to provide the logic level of the ODD OUT signal to transistor 574.

If the ODD OUT signal is at a logic low, transistor 574 turns on and transistor 576 turns off to charge the ODD DATA signal path 538 to a logic high. If the ODD OUT signal is at a logic high, transistor 574 is turned off and transistor 576 is turned on to discharge the ODD DATA signal path 538 to a logic low. Input latch 532 provides the bit wide ODD DATA signal to the data input of flip-flop 540. After the logic high to logic low transition at the output of inverter 528, the ODD DATA signal is the inverse of the ODD OUT signal at the output of flip-flop 540.

The ODD DATA signal is clocked into flip-flop 540 at the falling edge of the DELAYED CLK signal to make the logic level of the ODD OUT signal the same as the logic level of the ODD DATA signal. Flip-flop 540 provides the ODD OUT signal on path 542 to inverter 570, NOR gate 566 and as an output signal to other circuits in chip 34.

If the voltage of the DT signal transitions from a voltage greater than the voltage of the VREFL signal to a voltage less than the voltage of the VREFL signal, a logic high to logic low transition at the output of inverter 528 toggles the output of input latch 532 to make the logic level of the ODD DATA signal the inverse of the ODD OUT signal. The input latch 532 toggles once with the ODD OUT signal at one logic level. Multiple transitions of the DT signal voltage past the VREFL signal voltage, such as those transitions caused by crosstalk, inflections or slope reversals, do not toggle the output of input latch 532 multiple times.

A subsequent falling edge of the DELAYED CLK signal clocks the ODD DATA signal into flip-flop 540 to make the logic level of the ODD OUT signal the same as the logic level of the ODD DATA signal. The flip-flop 540 toggles once with the ODD DATA signal at one logic level. Multiple falling edges of the DELAYED CLK signal, such as those caused by crosstalk, inflections or slope reversals, do not toggle the output of flip-flop 540 multiple times.

Figure 7:
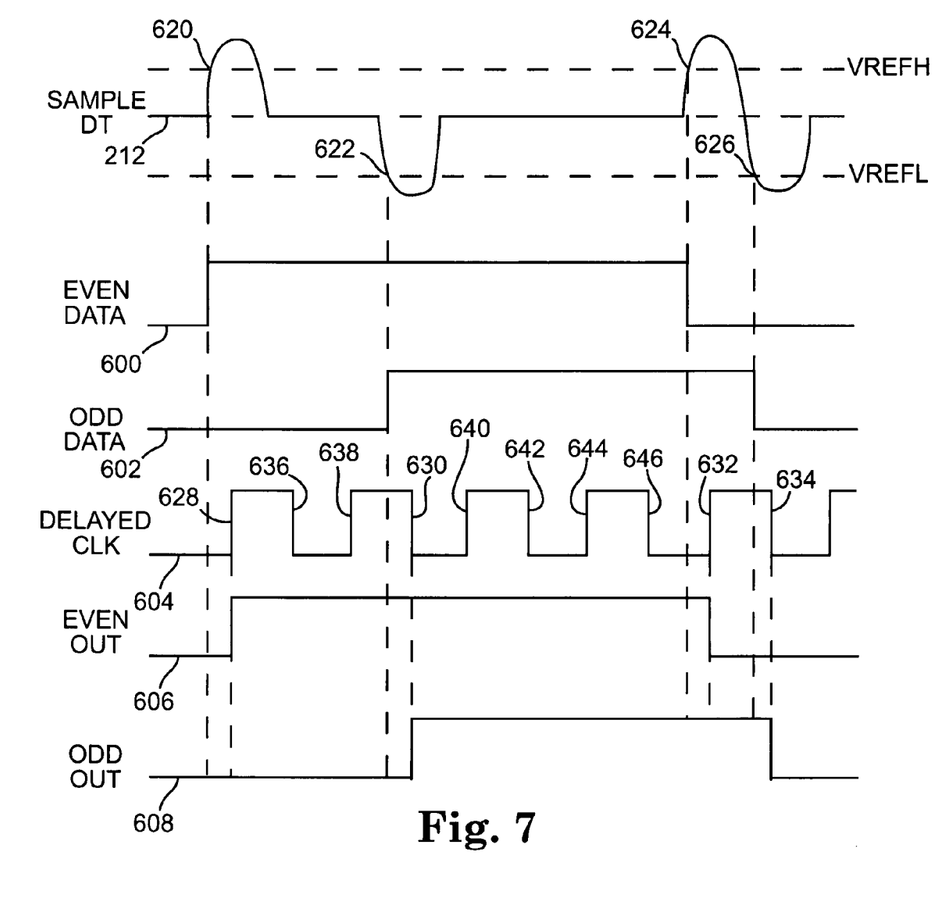
FIG. 7 is a timing diagram illustrating the timing of signals for the receiver of FIG. 6 for the chip to chip interface.

FIG. 7 is a timing diagram illustrating the timing of signals for receiver 500. The timing diagram includes sample DT signal 212 on signal path 150, EVEN DATA signal 600 on signal path 516, ODD DATA signal 602 on signal path 538, DELAYED CLK signal 604 on signal path 546, EVEN OUT signal 606 on signal path 520, and ODD OUT signal 608 on signal path 542.

To begin, flip-flops 518 and 540 are reset to logic low level outputs. Also, the sample DT signal 212 is provided at the termination voltage level of DT signal path 150, between the voltage levels of the VREFH and VREFL signals, to turn off transistors 558, 560, 574 and 576. The EVEN DATA and ODD DATA signal lines 516 and 538 are discharged to latch in low logic levels. In one embodiment, the EVEN DATA and ODD DATA signal lines 516 and 538 are discharged with reset transistors (not shown) to latch in the low logic levels.

The sample DT signal 212 rises above VREFH at 620 to toggle the EVEN DATA signal 600 from a logic low to a logic high. The DELAYED CLK signal 604 transitions from a logic low to a logic high at 628 to clock the logic high EVEN DATA signal 600 into flip-flop 518 and change the EVEN OUT signal 606 from a logic low to a logic high.

Next, the falling edge at 636 of DELAYED CLK signal 604 clocks flip-flop 540. With the ODD DATA signal at a logic low, the ODD OUT signal remains at a logic low. The rising edge at 638 of DELAYED CLK signal 604 clocks flip-flop 518 and with the EVEN DATA signal at a logic high, the EVEN OUT signal remains at a logic high.

Next, the sample DT signal 212 falls below VREFL at 622 to toggle the ODD DATA signal 602 from a logic low to a logic high. The DELAYED CLK signal 604 transitions from a logic high to a logic low at 630 to clock the logic high ODD DATA signal 602 into flip-flop 540 and change the ODD OUT signal 608 from a logic low to a logic high.

The rising edge at 640 of DELAYED CLK signal 604 clocks flip-flop 518. With the EVEN DATA signal at a logic high, the EVEN OUT signal remains at a logic high. The falling edge at 642 of DELAYED CLK signal 604 clocks flip-flop 540. With the ODD DATA signal at a logic high, the ODD OUT signal remains at a logic high. Next, the rising edge at 644 of DELAYED CLK signal 604 clocks flip-flop 518 and with the EVEN DATA signal at a logic high, the EVEN OUT signal remains at a logic high. The falling edge at 646 of DELAYED CLK signal 604 clocks flip-flop 540 and with the ODD DATA signal at a logic high, the ODD OUT signal remains at a logic high.

Next, the sample DT signal 212 rises above VREFH at 624, indicating a change in the positive bit stream data. The sample DT signal 212 rises at 624 to toggle the EVEN DATA signal 600 from a logic high to a logic low. The DELAYED CLK signal 604 transitions from a logic low to a logic high at 632 to clock the logic low EVEN DATA signal 600 into flip-flop 518 and change the EVEN OUT signal 606 from a logic high to a logic low.

Next, the sample DT signal 212 falls below VREFL at 626, indicating a change in the negative bit stream data. The sample DT signal 212 falls at 626 to toggle the ODD DATA signal 602 from a logic high to a logic low. The DELAYED CLK signal 604 transitions from a logic high to a logic low at 634 to clock the logic low ODD DATA signal 602 into flip-flop 540 and change the ODD OUT signal 608 from a logic high to a logic low.

The positive edge data stream and negative edge data stream provided to driver 38 are recreated as EVEN OUT signal 606 on path 520 and ODD OUT signal 608 on path 542. The double data rate data is transferred from chip 32 to chip 34 by toggling bits in receiver 500.

What is claimed is:

1. A chip to chip interface comprising:
  a signal line configured to receive a first signal and a second signal; and
  a receiver configured to provide a first output signal that corresponds to a first bit in response to a clock signal, wherein the receiver is configured to toggle the first bit based on the first output signal and in response to the first signal, and wherein the receiver is further configured to provide a second output signal that corresponds to a second bit in response to the clock signal, and to toggle the second bit based on the second output signal and in response to the second signal.

2. The chip to chip interface of claim 1, wherein the receiver is configured to toggle the first bit in response to the first signal with the first output signal at the same logic level as the first bit.

3. The chip to chip interface of claim 1, wherein the first signal represents a change in data at one edge of the clock signal and the receiver is configured to provide the first output signal in response to the one edge of the clock signal, wherein the first output signal represents the data.

4. The chip to chip interface of claim 1, wherein the receiver comprises a flip-flop configured to toggle the first bit based on the first output signal and in response to the first signal.

5. The chip to chip interface of claim 4, wherein the receiver comprises:
  an inverter configured to invert the first output signal and provide the inverted first output signal to the flip-flop.

6. The chip to chip interface of claim 1, wherein the receiver comprises an input latch configured to toggle the first bit based on the first output signal and in response to the first signal.

7. The chip to chip interface of claim 6, wherein the first output signal is provided to the input latch.

8. The chip to chip interface of claim 1, comprising:
  a driver configured to provide the first signal in response to a change in data at one edge of the clock signal.

9. The chip to chip interface of claim 1, wherein the first signal is received in one portion of the clock signal and the second signal is received in another portion of the clock signal.

10. The chip to chip interface of claim 9, wherein the one portion is one half cycle of the clock signal and the second portion is another half cycle of the clock signal.

11. The chip to chip interface of claim 1, comprising:
  a driver configured to provide the first signal in response to a change in first data at one edge of the clock signal and the second signal in response to a change in second data at another edge of the clock signal.

12. The chip to chip interface of claim 11, wherein the first output signal represents the first data and the second output signal represents the second data.

13. The chip to chip interface of claim 11, wherein the first data is positive edge data in a double data rate data stream and the second data is negative edge data in a double data rate data stream.

14. A chip to chip interface comprising:
  a driver configured to provide a first signal in response to a change in first data at one edge of a clock signal; and
  a receiver comprising:
    a first stage configured to receive the first signal and provide a first bit; and
    a second stage configured to receive the first bit and provide a first output signal that corresponds to the first bit in response to the clock signal, wherein the first stage is configured to toggle the first bit based on the first output signal and in response to the first signal.

15. The chip to chip interface of claim 14, wherein the first stage is configured to toggle the first bit in response to the first signal with the first output signal at the same logic level as the first bit.

16. The chip to chip interface of claim 14, wherein the second stage is configured to provide the first output signal that corresponds to the first bit in response to the one edge of the clock signal.

17. The chip to chip interface of claim 14, wherein the receiver comprises a flip-flop configured to toggle the first bit based on the first output signal and in response to the first signal.

18. The chip to chip interface of claim 14, wherein the receiver comprises an input latch configured to toggle the first bit based on the first output signal and in response to the first signal.

19. The chip to chip interface of claim 14, wherein the driver is configured to provide a second signal in response to a change in second data at another edge of the clock signal, the first stage is configured to receive the second signal and provide a second bit, and the second stage is configured to receive the second bit and provide a second output signal that corresponds to the second bit in response to the clock signal, wherein the first stage is configured to toggle the second bit based on the second output signal and in response to the second signal.

20. The chip to chip interface of claim 19, wherein the second stage is configured to provide the first output signal that corresponds to the first bit in response to the one edge of the clock signal and the second stage is configured to provide the second output signal that corresponds to the second bit in response to the other edge of the clock signal.

21. The chip to chip interface of claim 19, wherein the driver is configured to receive a double data rate data signal and provide a high voltage pulse as the first signal in response to a change in positive edge data and a low voltage pulse as the second signal in response to a change in negative edge data.

22. The chip to chip interface of claim 21, wherein the receiver comprises:
a first comparator configured to toggle the first bit; and
a second comparator configured to toggle the second bit, wherein the first comparator receives a first reference signal to compare to the high voltage pulse and the second comparator receives a second reference signal to compare to the low voltage pulse.

23. A chip to chip interface comprising:
a driver configured to provide a signal in response to a change in data at one edge of a clock signal; and
a receiver comprising:
a first flip-flop configured to respond to the signal and provide a first output signal; and
a second flip-flop configured to provide a second output signal that corresponds to the first output signal in response to the clock signal, wherein the first flip-flop is configured to change the first output signal based on the second output signal and in response to the signal.

24. The chip to chip interface of claim 23, wherein the first flip-flop is configured to change the first output signal in response to the signal with the second output signal at the same logic level as the first output signal and the second flip-flop is configured to provide the second output signal corresponding to the first output signal in response to the one edge of the clock signal.

25. A chip to chip interface comprising:
a driver configured to provide a signal in response to a change in data at one edge of a clock signal; and
a receiver comprising:
an input latch configured to respond to the signal and provide a first output signal; and
a flip-flop configured to provide a second output signal that corresponds to the first output signal in response to the clock signal, wherein the input latch changes the first output signal based on the second output signal and in response to the signal.

26. The chip to chip interface of claim 25, wherein the input latch is configured to change the first output signal in response to the signal with the second output signal at the same logic level as the first output signal and the flip-flop is configured to provide the second output signal corresponding to the first output signal in response to the one edge of the clock signal.

27. A chip to chip interface comprising:
means for receiving a first signal;
means for providing a first output signal that corresponds to a first bit in response to a clock signal;
means for changing the first bit based on the first output signal and in response to the first signal;
means for receiving a second signal;
means for providing a second output signal that corresponds to a second bit in response to the clock signal; and
means for changing the second bit based on the second output signal and in response to the second signal.

28. The chip to chip interface of claim 27, wherein the means for changing comprises:
means for responding to the first signal to provide a first signal clock; and
means for toggling the first bit based on receiving the first signal clock while the first output signal is at the same logic level as the first bit.

29. The chip to chip interface of claim 27, wherein the first signal corresponds to a change in data at one edge of the clock signal and the means for providing comprises:
means for providing the first output signal in response to the one edge of the clock signal.

30. The chip to chip interface of claim 27, comprising:
means for providing the first signal in response to a change in data at one edge of the clock signal.

31. The chip to chip interface of claim 27, comprising:
means for providing the first signal in response to a change in first data at one edge of the clock signal; and
means for providing the second signal in response to a change in second data at another edge of the clock signal.

32. A method for communicating data between chips comprising:
receiving a first signal;
providing a first output signal that corresponds to a first bit in response to a clock signal;
changing the first bit based on the first output signal and in response to the first signal;
receiving a second signal;
providing a second output signal that corresponds to a second bit in response to the clock signal; and
changing the second bit based on the second output signal and in response to the second signal.

33. The method of claim 32, wherein changing the first bit comprises:
responding to the first signal to provide a first signal clock;
receiving the first signal clock while the first output signal is at the same logic level as the first bit; and
toggling the first bit.

34. The method of claim 32, comprising:
providing the first signal in response to a change in data at one edge of the clock signal, wherein providing the first output signal comprises providing the first output signal in response to the one edge of the clock signal.

35. The method of claim 32, comprising:
providing the first signal in response to a change in first data at one edge of the clock signal; and
providing the second signal in response to a change in second data at another edge of the clock signal.

36. A chip to chip interface comprising:
a signal line configured to receive a first signal; and
a receiver configured to provide a first output signal that corresponds to a first bit in response to a clock signal, wherein the receiver is configured to toggle the first bit based on the first output signal and in response to the first signal and the receiver comprises:
a flip-flop configured to toggle the first bit based on the first output signal and in response to the first signal; and an inverter configured to invert the first output signal and provide the inverted first output signal to the flip-flop.

37. A chip to chip interface comprising:
a signal line configured to receive a first signal; and
a receiver configured to provide a first output signal that corresponds to a first bit in response to a clock signal, wherein the receiver is configured to toggle the first bit based on the first output signal and in response to the first signal and the receiver comprises:
an input latch configured to toggle the first bit based on the first output signal and in response to the first signal, wherein the first output signal is provided to the input latch.

* * * * *